United States Patent [19]

Sakamoto et al.

[11] 4,178,464
[45] Dec. 11, 1979

[54] PROCESS FOR PRODUCING METHACRYLIC ACID

[75] Inventors: Teruhisa Sakamoto; Shigeo Nakamura; Nobuyuki Taniguchi, all of Shin-nanyo, Japan

[73] Assignee: Toyo Soda Manufacturing Co., Ltd., Yamaguchi, Japan

[21] Appl. No.: 924,570

[22] Filed: Jul. 14, 1978

[30] Foreign Application Priority Data

Jul. 22, 1977 [JP] Japan .................................. 52-87247

[51] Int. Cl.$^2$ ........................ C07C 51/32; C07C 57/04
[52] U.S. Cl. ................................... 562/535; 252/435; 252/437; 562/548
[58] Field of Search ................. 562/535; 252/435, 437

[56] References Cited

U.S. PATENT DOCUMENTS

| | | | |
|---|---|---|---|
| 3,875,220 | 4/1975 | White et al. | 562/535 |
| 4,035,417 | 7/1977 | Izawa et al. | 562/535 |

Primary Examiner—Vivian Garner
Attorney, Agent, or Firm—Oblon, Fisher, Spivak, McClelland & Maier

[57] ABSTRACT

A process for producing methacrylic acid by the vapor phase catalytic oxidation of methacrolein with molecular oxygen or a molecular oxygen-containing gas comprises using a catalyst of multi-elemental complex oxide having the formula $$Mo_aP_bAs_cV_dCu_eCe_fCr_gO_h$$

wherein a, b, c, d, e, f, g and h respectively represent atomic ratios and a=12, b=0.5 to 3.0, c=0.01 to 1.2, d=0.01 to 2.0, e=0.01 to 2.0, f=0.01 to 1.2, g=0 to 2.0; and h is decided on the valences of the other components such as usually 37 to 60 which is prepared with or without a reduction using a dibasic carboxylic acid, an oxycarboxylic acid, mannitol or pyrogallol.

8 Claims, No Drawings

PROCESS FOR PRODUCING METHACRYLIC ACID

BACKGROUND OF THE INVENTION

The present invention relates to a process for producing methacrylic acid by the vapor phase catalytic oxidation of methacrolein with the molecular oxygen or a molecular oxygen-containing gas. More particularly, it relates to a process for producing methacrylic acid in high yield from methacrolein by using a novel multi-elemental catalyst of complex oxide containing Mo, P, As, V, Cu, Ce and O, if necessary, Cr with or without a reducing organic agent.

Many patents and patent applications on various processes for producing unsaturated carboxylic acids such as acrylic acid or methacrylic acid by the vapor phase catalytic oxidation of the unsaturated aldehyde such as acrolein or methacrolein have been disclosed.

The process for producing acrylic acid by the oxidation of acrolein have been practically worked in a large industrial size because of development of the catalytic systems having high catalytic activity.

However, in the process for producing methacrylic acid from methacrolein which is similar to the former, the result has not been satisfactory for the industrial operation and it has not been practically applied.

Various catalysts have been proposed as the catalysts for producing acrylic acid from acrolein.

In usual, the Mo-V type catalysts have high catalytic activities. In Japanese Patent Publication Nos. 1775/1966, 12129/1969 and 19296/1973, high single flow yields of acrylic acid such as about 80% have been obtained.

However, even though the oxidation of methacrolein was carried out by using these known Mo-V type catalysts, the amounts of the by-products of carbon monoxide, carbon dioxide and acetic acid have been high whereby the single flow yield of methacrylic acid has been remarkably low. The reason is that methacrylic acid is easily and gradually decomposed by the oxidation of the catalysts.

As the catalysts for producing methacrylic acid by the vapor phase oxidation of methacrolein, the heteropolyacid type catalysts such as Mo-P type catalysts which result in mild reaction have been mainly developed. Many patent applications have been filed on these type catalysts such as the catalysts comprising the components of Mo, P, Tl and at least one of Si, Cr, Al and Ti in Japanese Patent Publication No. 24288/1975; the catalysts comprising the components of Mo, P, V and at least one of Na, K, Rb and Cs in Japanese Unexamined Patent Publication No. 96522/1975; the catalysts comprising the components of Mo, P, V and at least one of K, Rb, Cs and Ta or further comprising the component of at least one of Sr, Zn, Cd, Nb, B, Pb, Bi and W in Japanese Unexamined Patent Publication No. 123619/1975; the catalysts comprising the components of Mo, P, V and Sb, or further comprising the component of at least one of Fe, Ni, Mg, Ca, Al, W, Cu, Zn and Cr in Japanese Unexamined Patent Publication No. 23216/1976.

However, the known Mo-P type catalysts usually have low catalytic activity and require high reaction temperature.

As described in Japanese Patent Publication No. 27526/1965 and Japanese Unexamined Patent Publication No. 33082/1972, remarkable deterioration of catalytic activity has been caused by the thermal deterioration etc. and a satisfactory catalytic life could not be obtained disadvantageously in the industrial operation.

In the industrial operation, it is usually important to use the catalyst which imparts high conversion of methacrolein fed and high selectivity of methacrylic acid and it is also important and indispensable to give high catalytic activity (space time yield) and high durability of catalyst (life). From these viewpoints, the conventional process for producing methacrylic acid has not been satisfactory in the industrial operation.

The inventors have proposed the catalysts comprising the components of Mo, P, V, Ce and Cu as the catalyst for producing methacrylic acid from methacrolein. These catalysts impart relatively high catalytic activity at low temperature and high durability of the catalysts, however the satisfactory selectivity of methacrylic acid could not be attained by these catalysts.

The inventors have further studied to improve the selectivity by adding various elements to the catalyst system. As the results, the inventors have found that the selectivity could be remarkably improved by adding As component to the components of Mo, P, V, Ce and Cu. The present invention has been attained by the finding.

On the other hand, as the catalysts comprising As component which relate to the present invention, the catalysts comprising the components of Mo, P and As have been proposed in Japanese Patent Publication Nos. 10652/1974 and 3297/1975.

When these catalysts are used, remarkably high selectivity could be attained. However, the catalytic activity is remarkably low and the catalytic life is not always satisfactory.

Accordingly, catalysts have been proposed which further comprise an additional metal element or both the metal element and alkali metal element such as the catalysts comprising the components of Mo, P and As and one or two of V, Cu, Fe and Mn in Japanese Patent Publication No. 23014/1975; the catalysts comprising the components of Mo, P, As and at least one of V, W, Cu, Fe, Mn and Sn or further the component of at least one of Li, Na, K, Rb and Cs in Japanese Unexamined Patent Publication No. 41811/1975; the catalysts comprising the components of Mo, P, As, Cu or V and at least one of Li, Na, K, Rb and Cs and at least one of Mg, Al, Si, Ca, Ti, Zr, Ag, Sb, Te, Ba and Ta in Japanese Unexamined Patent Publication No. 115414/1976.

Certain catalysts impart relatively high single flow yield of methacrylic acid, however, the catalytic activity at relatively low temperature of about 300° C. is not satisfactorily high.

The catalysts of the present invention impart excellent catalytic activity and durability in comparison with these known catalysts. The reason is considered to be given by the effect of Ce.

As the catalysts comprising Ce component which relate to the present invention, catalysts comprising the components of Mo, P and V or the addition of at least one of Bi, As, B, Ce Cr, Ag, Fe, W, Pb, Mn, Ta, Te, Ni, Nb, Sn and Cu have been proposed in U.S. Pat. No. 3,875,220; the catalysts comprising the components of Mo, P, V and W or the addition of at least one of Sn, Sb, As, Cu, Ce, B, Cr, Fe, Ni, Co, U, Mn, Ag, Pb, Rh, Cd, Bi, In, Zn and La in Japanese Unexamined Patent Publication No. 115416/1976; the catalysts comprising the components of Mo, P and at least one of K, Rb, Cs and Tl, and at least one of Rh, Ce and Zr in Japanese Unexamined Patent Publication No. 108016/1976, etc.

The inventors have proposed the catalysts comprising the components of Mo, P, V and Ce in Japanese Unexamined Patent Publication No. 136615/1976. However, these catalysts have low catalytic activity and could not impart satisfactory yield of methacrylic acid and the catalytic life in the industrial operation.

The inventors have further studied to find the improved catalysts. As the results, the inventors have found that remarkably excellent catalytic characteristics could be obtained by adding Cr component to the components of Mo, P, As, V, Cu and Ce.

Moreover, the inventors have found that when an organic compound such as dibasic carboxylic acids, oxycarboxylic acids is added for the reduction during the preparation of the catalyst, the yield is increased and the satisfactory results can be obtained in the industrial operation.

SUMMARY OF THE INVENTION

It is an object of the present invention to provide a process for producing methacrylic acid in high single flow yield or high space time yield of methacrylic acid under a long life of a catalyst having high catalytic activity.

The foregoing and other objects of the present invention have been attained by providing a process for producing methacrylic acid in high yield and economical condition by the vapor phase catalytic oxidation of methacrolein with molecular oxygen or a molecular oxygen-containing gas which comprises using a catalyst of multi-elemental complex oxide having the formula $$Mo_aP_bAs_cV_dCu_eCe_fCr_gO_h$$

wherein a, b, c, d, e, f, g and h respectively represent atomic ratios and a=12, b=0.5 to 3.0, c=0.01 to 1.2, d=0.01 to 2.0, e=0.01 to 2.0, f=0.01 to 1.2, g=0 to 2.0; and h is decided on the valences of the other components such as usually 37 to 60 which is prepared with or without a reduction using a dibasic carboxylic acid, an oxycarboxylic acid, mannitol or pyrogallol.

DETAILED DESCRIPTION OF THE PREFERRED EMBODIMENTS

The catalysts of the present invention are effective in the above-mentioned ranges of the components and especially impart excellent catalytic characteristics, when the catalyst has the formula wherein a=12, b=1.2 to 2.4, c=0.06 to 0.8, d=0.1 to 1.0, e=0.1 to 0.8, f=0.1 to 0.6, g=0 to 0.8 and h is decided on the valences of the other components such as usually 40 to 52.

Moreover, the catalytic characteristics can be further improved by the addition of an organic compound such as dibasic carboxylic acids, e.g. oxalic acid, succinic acid, oxycarboxylic acids e.g. tartaric acid, citric acid; mannitol and pyrogallol for the reduction.

The amount of the organic compound is usually in a range of 5 to 40 wt. % preferably 10 to 20 wt. % to the catalytic component oxides.

In accordance with the present invention, the catalytic activity is remarkably high and the catalyst can be used at relatively low temperature about 280° to 300° C. and the catalytic characteristics can be stable for a long time and methacrylic acid can be produced from methacrolein in high yield and economical operation.

The catalysts of the present invention can be prepared by the known methods usually the precipitation-concentration method or the impregnation-supporting method etc. The catalytic component oxides can be used as the catalyst in the present invention without supporting them on a carrier. It is possible to improve the mechanical strength of the catalyst and to easily remove the heat caused by the reaction by press-molding a mixture of the catalytic component oxide and a desired powder such as diatomaceous earth, kaolin, active clay etc. or impregnating and supporting on a desired preshaped carrier such as α-alumina, silica, silica-alumina, silicon-carbide etc.

The typical method of preparing the catalyst of the present invention will be illustrated. Ammonium molybdate is used as molybdenum source. An aqueous solution of ammonium phosphate and ammonium arsenate is added to an aqueous solution of ammonium molybdate and an aqueous solution of ammonium metavanadate (and ammonium chromate), and then, an aqueous solution of cerous nitrate is added and cuprous chloride (or cuprous bromide) is added and diatomaceous earth is added to the mixture. The mixture is heated and concentrated to dry under stirring.

As the copper source, various copper compounds can be used. When the cuprous halides such as cuprous chloride or cuprous bromide are used, superior catalytic characteristics can be obtained.

When the organic compound is added, suitable amount of an aqueous solution of the organic compound may be added during the preparation of the catalyst. The diatomaceous earth is added in a range of 0 to 30 wt. % preferably 5 to 20 wt. %.

In the sintering step for the catalyst of the present invention, it is unnecessary to carry out a special heat-treatment. The slurry prepared by the above-mentioned method is preferably concentrated and dried and then, it is heated to calcine it at about 300° C. for ten and several hours and further heated to sinter it at 350° to 400° C. for several to ten and several hours.

In the process of the present invention, the catalyst can be used not only in a fixed bed process but also in a fluidized bed process. The apparent contact time is usually in a range of 0.5 second to 10 seconds, preferably 1 second to 5 seconds, and the pressure is preferably in a range of atmospheric pressure to 2 atm. The reaction temperature can be in a broad range of 240° to 380° C. and preferably 260° to 320° C. from the viewpoint of the space time yield and the catalytic life.

The compositions of the feed gas can be selected from a broad range. It is unnecessary to precisely limit the concentrations of methacrolein and molecular oxygen. It is preferable to select the mole ratio of the molecular oxygen to methacrolein in a range of 1 to 10 especially 1 to 5. In usual, it is preferable to feed 1 to 7 vol. % of methacrolein, 50 to 90 vol. % of air and 5 to 50 vol. % of steam. If necessary, oxygen and a diluent gas such as nitrogen, steam and carbon dioxide can be used. The starting material of methacrolein can be the product obtained by the vapor phase oxidation of isobutylene without condensing it. The starting material can contain small amounts of impurities such as carbon dioxide, carbon monoxide, acetic acid, acetone or unreacted isobutylene and n-butene, butane etc.

The unreacted methacrolein can be separated and recovered and used as the starting material. The resulting methacrylic acid can be separated by the conventional methods such as a solvent-extraction method from the condensed reaction mixture.

The present invention will be illustrated by certain examples which are not construded as limiting of the invention.

The following definitions apply to the conversion of methacrolein, the selectivities of methacrylic acid, acetic acid and the single flow yield of methacrylic acid.

$$\text{Conversion of methacrolein}(\%) = \frac{\text{moles of methacrolein reacted}}{\text{moles of methacrolein fed}} \times 100$$

$$\text{Selectivity}(\%) = \frac{\text{moles of each product} \times \frac{\text{carbon number of each product}}{4}}{\text{moles of methacrolein reacted}} \times 100$$

$$\text{Single flow yield of methacrylic acid}(\%) = \frac{\text{moles of methacrylic acid produced}}{\text{moles of methacrolein fed}} \times 100$$

The results of the examples and references are obtained by the following test methods.

In a Pyrex glass fixed bed reaction column having an inner diameter of 20 mm, 16 g of a catalyst was filled. The reaction column was heated in an electric tubular furnace and a feed gas containing about 5 vol. % of methacrolein, about 60 vol. % of air and 35 vol. % of steam was passed for 2 seconds of apparent contact time ($SV \approx 2,000\ hr^{-1}$) and the reaction temperature was in a range of 280° C. to 320° C. usually 300° C.

The catalytic life was measured by filling 40 g of a catalyst in a U shape column made of stainless steel and having an inner diameter of about 25 mm, and dipping the U shape column in a fused bath and feeding continuously the same feed gas at the apparent constant time ($SV \approx 1,800\ hr^{-1}$) at the reaction temperature of 300° C.

The reaction products were analyzed by the neutralization and gas chromatography.

EXAMPLE 1

In 300 ml of distilled water heated at about 80° C., 212 g of ammonium paramolybdate $(NH_4)_6Mo_7O_{24}\cdot 4H_2O$ and 7.0 g of ammonium metavananadate $NH_4VO_3$ were dissolved and 120 ml of aqueous solution containing 23.8 g of ammonium phosphate $(NH_4)_2HPO_4$ and 3.5 g of ammonium arsenate $(NH_4)_2HAsO_4$ was added to the solution and the mixture was heated on a water bath under stirring and then, 80 ml of aqueous solution containing 8.7 g of cerous nitrate $Ce(NO_3)_3\cdot 6H_2O$ was added to the mixture, and 4.0 g of cuprous chloride was added and 23 g of diatomaceous earth was further added to the solution.

The mixture was heated and concentrated under stirring. The resulting solid product was dried and pulverized and press-molded to obtain pellets having a diameter of 5 mm and the pellets were calcined at 300° C. for 2 hours in air and then were sintered at 380° C. for 6 hours to obtain the catalyst having the formula of $$Mo_{12}P_{1.8}As_{0.2}V_{0.6}Cu_{0.4}Ce_{0.2}$$

(except oxygen) and containing 10 wt. % of diatomaceous earth.

The catalyst was used at the reaction temperature of 300° C. for the contact time of 2 seconds in the oxidation of methacrolein.

As the results, the conversion of methacrolein was 76.2%; the selectivity of methacrylic acid was 82.9%; the selectivity of acetic acid was 3.4%; the selectivity of carbon monoxide and carbon dioxide was 12.3% and the single flow yield of methacrylic acid was 63.2%.

Reference 1

In accordance with the process of Example 1 except adding no cerous nitrate, a catalyst having the formula of $$Mo_{12}P_{1.8}As_{0.2}V_{0.6}Cu_{0.4}\ \text{(except oxygen)}$$

and containing 10 wt. % of diatomaceous earth was prepared.

The catalyst was used in the conditions of the reaction in Example 1.

As the results, the conversion of methacrolein was 52.8%; the selectivity of methacrylic acid was 83.1%; the selectivity of acetic acid was 3.4%; the selectivity of carbon monoxide and carbon dioxide was 11.9% and the single flow yield of methacrylic acid was 43.9%.

Reference 2

In accordance with the process of Example 1 except adding no ammonium metavanadate, a catalyst having the formula of $$Mo_{12}P_{1.8}As_{0.2}Cu_{0.4}Ce_{0.2}\ \text{(except oxygen)}$$

and containing 10 wt. % of diatomaceous earth was prepared.

The catalyst was used in the conditions of the reaction in Example 1.

As the results, the conversion of methacrolein was 36.3%; the selectivity of methacrylic acid was 84.8%; the selectivity of acetic acid was 2.9%; the selectivity of carbon monoxide and carbon dioxide was 11.2% and the single flow yield of methacrylic acid was 30.8%.

EXAMPLES 2 to 21 and References 3 to 15

In accordance with the process of Example 1, except varying the amount of Ce, As, P, V and Cu, the catalysts having the different formula were prepared.

The catalysts were used at the reaction temperature of 300° C. for the contact time of 2 seconds in the oxidation of methacrolein.

The results are shown in Table 1.

Table 1

| No. | | Catalytic components (atomic raios) | | | | | | Conversion of methacrolein (%) | Selectivity methacrylic acid (%) | Single flow yield of methacrylic acid (%) |
| --- | --- | --- | --- | --- | --- | --- | --- | --- | --- | --- |
| | | Mo | P | As | V | Cu | Ce | | | |
| Example | 2 | 12 | 1.8 | 0.4 | 0.6 | 0.4 | 0.1 | 62.4 | 86.3 | 53.9 |
| Example | 3 | 12 | 1.8 | 0.4 | 0.6 | 0.4 | 0.3 | 75.2 | 85.6 | 64.4 |
| Example | 4 | 12 | 1.8 | 0.4 | 0.6 | 0.4 | 0.6 | 64.5 | 84.7 | 54.6 |
| Example | 5 | 12 | 1.8 | 0.4 | 0.6 | 0.4 | 1.2 | 58.7 | 85.4 | 50.1 |
| Reference | 3 | 12 | 1.8 | 0.4 | 0.6 | 0.4 | 1.8 | 32.6 | 87.5 | 28.5 |
| Reference | 4 | 12 | 1.8 | 0 | 0.6 | 0.4 | 0 | 49.4 | 65.3 | 32.3 |
| Example | 6 | 12 | 1.8 | 0.06 | 0.6 | 0.4 | 0.2 | 80.7 | 73.4 | 59.2 |

Table 1-continued

| No. | | Mo | P | As | V | Cu | Ce | Conversion of methacrolein (%) | Selectivity methacrylic acid (%) | Single flow yield of methacrylic acid (%) |
|---|---|---|---|---|---|---|---|---|---|---|
| Example | 7 | 12 | 1.8 | 0.4 | 0.6 | 0.4 | 75.6 | 86.1 | 65.1 | |
| Example | 8 | 12 | 1.8 | 0.8 | 0.6 | 0.4 | 0.2 | 62.2 | 89.7 | 55.8 |
| Example | 9 | 12 | 1.8 | 1.2 | 0.6 | 0.4 | 0.2 | 54.5 | 91.8 | 50.0 |
| Reference | 5 | 12 | 1.8 | 1.6 | 0.6 | 0.4 | 0.2 | 37.4 | 92.2 | 34.5 |
| Reference | 6 | 12 | 0 | 1.6 | 0.6 | 0.4 | 0.2 | 3.2 | 92.6 | 2.7 |
| Reference | 7 | 12 | 0 | 0.4 | 0.6 | 0.4 | 0.2 | 37.3 | 28.8 | 10.7 |
| Example | 10 | 12 | 0.5 | 0.4 | 0.6 | 0.4 | 0.2 | 63.8 | 79.3 | 50.6 |
| Example | 11 | 12 | 1.2 | 0.4 | 0.6 | 0.4 | 0.2 | 71.4 | 85.3 | 60.9 |
| Example | 12 | 12 | 2.0 | 0.4 | 0.6 | 0.4 | 0.2 | 77.6 | 84.5 | 65.6 |
| Example | 13 | 12 | 3.0 | 0.4 | 0.6 | 0.4 | 0.2 | 58.0 | 87.1 | 50.5 |
| Reference | 8 | 12 | 4.0 | 0.4 | 0.6 | 0.4 | 0.2 | 27.3 | 86.6 | 23.6 |
| Reference | 9 | 12 | 1.8 | 0.4 | 0 | 0.4 | 0 | 22.5 | 87.3 | 19.6 |
| Example | 4 | 12 | 1.8 | 0.4 | 0.1 | 0.4 | 0.2 | 59.7 | 84.5 | 50.4 |
| Example | 15 | 12 | 1.8 | 0.4 | 0.4 | 0.4 | 0.2 | 74.2 | 84.4 | 62.6 |
| Example | 16 | 12 | 1.8 | 0.4 | 1.0 | 0.4 | 0.2 | 62.4 | 87.0 | 54.3 |
| Example | 17 | 12 | 1.8 | 0.4 | 2.0 | 0.4 | 0.2 | 54.1 | 87.8 | 47.5 |
| Reference | 10 | 12 | 1.8 | 0.4 | 3.0 | 0.4 | 0.2 | 39.2 | 85.9 | 33.7 |
| Reference | 11 | 12 | 1.8 | 0.4 | 0.6 | 0 | 0 | 18.4 | 84.5 | 15.5 |
| Reference | 12 | 12 | 1.8 | 0.4 | 0.6 | 0 | 0.2 | 28.7 | 82.0 | 23.5 |
| Example | 18 | 12 | 1.8 | 0.4 | 0.6 | 0.1 | 0.2 | 62.5 | 85.4 | 53.4 |
| Example | 19 | 12 | 1.8 | 0.4 | 0.6 | 0.3 | 0.2 | 75.3 | 86.0 | 64.8 |
| Example | 20 | 12 | 1.8 | 0.4 | 0.6 | 0.8 | 0.2 | 63.2 | 86.3 | 54.5 |
| Example | 21 | 12 | 1.8 | 0.4 | 0.6 | 2.0 | 0.2 | 55.8 | 87.3 | 48.7 |
| Reference | 13 | 12 | 1.8 | 0.4 | 0.6 | 3.0 | 0.2 | 29.5 | 84.7 | 25.0 |
| Reference | 14 | 12 | 1.8 | 0 | 0.6 | 0 | 0 | 25.8 | 64.7 | 16.7 |
| Reference | 15 | 12 | 1.8 | 0 | 0 | 0.4 | 0.2 | 31.7 | 62.5 | 19.8 |

EXAMPLES 22 TO 28

In accordance with the process of Example 1 except adding 5.7 g of cuprous bromide CuBr instead of 4.0 g of cuprous chloride, the catalyst was prepared.

In accordance with the process of Example 1 except adding cupric nitrate, cupric acetate, cupric chloride, cuprous fluoride, cuprous iodide or cuprous oxide instead of cuprous chloride, the catalysts were prepared.

The catalysts were used in the conditions of the reaction in Example 1. The results are shown in Table 2.

The catalysts had the same formula of

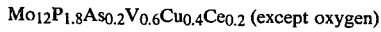

$Mo_{12}P_{1.8}As_{0.2}V_{0.6}Cu_{0.4}Ce_{0.2}$ (except oxygen)

and contained 10 wt. % of diatomaceous earth. In these processes, cupric nitrate, cupric acetate and cupric chloride were respectively added in a form of aqueous solution and the other compounds were respectively added in a form of solid.

Table 2

| | Kind of copper salt | Conversion of methacrolein (%) | Selectivity methacrylic acid (%) | Single flow yield of methacrylic acid (%) |
|---|---|---|---|---|
| Example 22 | CuBr | 74.7 | 84.1 | 62.8 |
| Example 23 | Cu(NO$_3$)$_2$ | 63.2 | 83.5 | 52.8 |
| Example 24 | CuAc$_2$ | 64.5 | 83.6 | 53.9 |
| Example 25 | CuCl$_2$ | 63.7 | 84.2 | 53.6 |
| Example 26 | CuF | 75.3 | 82.4 | 62.0 |
| Example 27 | CuI | 70.5 | 84.6 | 59.6 |
| Example 28 | Cu$_2$O | 60.3 | 85.0 | 51.3 |

EXAMPLE 29

In 240 ml of distilled water heated at about 80° C., 212 g of ammonium paramolybdate was dissolved and 120 ml of aqueous solution containing 23.8 g of ammonium phosphate and 7.0 g of ammonium arsenate was added to the solution.

In 200 ml of hot water 7.0 g of ammonium metavanadate and 4.6 g of ammonium chromate (NH$_4$)$_2$CrO$_4$ were dissolved and the solution was added to the former solution, and then 80 ml of aqueous solution containing 8.7 g of cerous nitrate was added and 4.0 g of cuprous chloride was further added to the mixture which was stirred and then 24 g of diatomaceous earth was further added as a carrier. The mixture was heated and concentrated under stirring on a hot water bath and was dried. The resulting solid product was pulverized and press-molded to obtain pellets having a diameter of 5 mm and the pellets were calcined at 300° C. for about 2 hours in air and were sintered at 380° C. for 6 hours to obtain the catalyst having the formula of

$Mo_{12}P_{1.8}As_{0.4}V_{0.6}Cu_{0.4}Ce_{0.2}Cr_{0.3}$ and containing 10 wt. % of diatomaceous earth.

The catalyst was used at the reaction temperature of 300° C. for the contact time of 2 seconds in the oxidation of methacrolein.

As the results, the conversion of methacrolein was 80.7%; the selectivity of methacrylic acid was 84.2%; and the single flow yield of methacrylic acid was 67.9%.

EXAMPLES 30 to 34 and References 16 to 21

In accordance with the process of Example 29 except varying the amount of chromium compound in Mo P As V Cu Ce type catalyst, various catalysts were prepared.

In accordance with the process of Example 29 except eliminating Ce, Cu, V or As from the Mo P As V Cu Ce Cr type catalyst, various catalysts were prepared.

The catalysts were used at the reaction temperature of 300° C. for the contact time of 2 seconds in the oxidation of methacrolein. The results are shown in Table 3.

Table 3

| | Catalytic components (atomic ratios) | | | | | | Conversion of methacrolein (%) | Selectivity methacrylic acid (%) | Single flow yield of methacrylic acid (%) |
|---|---|---|---|---|---|---|---|---|---|
| | Mo | P | As | V | Cu | Ce | Cr | | |
| Example 30 | 12 | 1.8 | 0.4 | 0.6 | 0.4 | 0.2 | 0.1 | 77.3 | 85.9 | 66.4 |
| Example 31 | 12 | 1.8 | 0.4 | 0.6 | 0.4 | 0.2 | 0.5 | 82.0 | 85.1 | 69.8 |
| Example 32 | 12 | 1.8 | 0.4 | 0.6 | 0.4 | 0.2 | 0.8 | 76.8 | 85.3 | 65.5 |
| Example 33 | 12 | 1.8 | 0.4 | 0.6 | 0.4 | 0.2 | 1.2 | 72.6 | 85.8 | 62.3 |
| Example 34 | 12 | 1.8 | 0.4 | 0.6 | 0.4 | 0.2 | 2.0 | 62.7 | 86.0 | 53.9 |
| Reference 16 | 12 | 1.8 | 0.4 | 0.6 | 0.4 | 0.2 | 3.0 | 46.5 | 87.2 | 40.5 |
| Reference 17 | 12 | 1.8 | 0.4 | 0.6 | 0 | 0 | 0.5 | 23.4 | 86.7 | 20.3 |
| Reference 18 | 12 | 1.8 | 0.4 | 0.6 | 0 | 0.2 | 0.5 | 39.5 | 84.0 | 33.2 |
| Reference 19 | 12 | 1.8 | 0.4 | 0 | 0 | 0.2 | 0.5 | 28.5 | 82.6 | 23.5 |
| Reference 20 | 12 | 1.8 | 0 | 0.6 | 0.4 | 0 | 0.5 | 62.0 | 63.7 | 39.5 |
| Reference 21 | 12 | 1.8 | 0 | 0 | 0.4 | 0.2 | 0.5 | 56.3 | 64.2 | 36.1 |

EXAMPLE 35

In 240 ml of distilled water heated at 80° C., 212 g of ammonium paramolybdate $(NH_4)_6Mo_7O_{24}\cdot 4H_2O$ was dissolved and, 120 ml of aqueous solution containing 23.8 g of ammonium phosphate $(NH_4)_2HPO_4$ and 7.0 g of ammonium arsenate $(NH_4)_2HAsO_4$ was added to the solution and the mixture was heated under stirring.

In 160 ml of hot water, 7.0 g of ammonium metavanadate $NH_4VO_3$ was dissolved and 20 g of oxalic acid $H_2C_2O_4\cdot 2H_2O$ was added and the mixture was heated under stirring and then the resulting solution was added to the former solution. Then, 80 ml of aqueous solution containing 8.7 g of cerous nitrate $Ce(NO_3)_3\cdot 6H_2O$ was added and 4.0 g of cuprous chloride CuCl was added and 23 g of diatomaceous earth was further added to the solution. The mixture was heated and concentrated under stirring. The resulting solid product was dried and pulverized and press-molded to obtain pellets having a diameter of 5 mm and the pellets were calcined at 300° C. for 2 hours and were sintered at 380° C. for 6 hours to obtain the catalyst having the formula $Mo_{12}P_{1.8}As_{0.4}V_{0.6}Cu_{0.4}Ce_{0.2}$ (except oxygen)

and containing 10 wt. % of diatomaceous earth.

The catalyst was used at the reaction temperature of 300° C. for the contact time of 2 seconds in the oxidation of methacrolein.

As the results, the conversion of methacrolein was 87.8%; the selectivity of methacrylic acid of 87.8%; the selectivity of acetic acid of 3.0%; the selectivity of carbon monoxide and carbon dioxide was 10.3% and the single flow yield of 75.0%.

Reference 22

In accordance with the process of Example 1 except adding no cerous nitrate, a catalyst having the formula of $Mo_{12}P_{1.8}As_{0.4}V_{0.6}Cu_{0.4}$ (except oxygen)

and containing 10 wt. % of diatomaceous earth was prepared.

The catalyst was used in the condition of the reaction in Example 35.

As the results, the conversion of methacrolein was 57.6%; the selectivity of methacrylic acid was 84.9%; the selectivity of acetic acid was 27%; the selectivity of carbon monoxide and carbon dioxide was 10.9%; and the single flow yield of methacrylic acid was 48.9%.

Reference 23

In accordance with the process of Example 1 except adding no ammonium vanadate, a catalyst having the formula of $Mo_{12}P_{1.8}As_{0.4}Cu_{0.4}Ce_{0.2}$ (except oxygen)

and containing 10 wt. % of diatomaceous earth was prepared.

The catalyst was used in the condition of the reaction in Example 35.

As the results, the conversion of methacrolein was 41.6%; the selectivity of methacrylic acid was 86.3%; the selectivity of acetic acid was 2.5%; the selectivity of carbon monoxide and carbon dioxide was 9.8%; and the single flow yield of methacrylic acid was 35.9%.

EXAMPLES 36 TO 42

In accordance with the process of Example 35 except varying a kind and amount of the organic compound (dibasic carboxylic acids, oxycarboxylic acids and pyrogallol), various catalysts having the formula of $Mo_{12}P_{1.8}As_{0.4}V_{0.6}Cu_{0.4}Ce_{0.2}$ and containing 10 wt. % of diatomaceous earth were prepared.

The catalysts were used at the reaction temperature of 300° C. for the contact time of 2 seconds in the oxidation of methacrolein.

The results are shown in Table 4.

Table 4

| | Kind of organic material | Amount of organic material | Conversion of methacrolein (%) | Selectivity methacrylic acid (%) | Single flow yield of methacrylic acid (%) |
|---|---|---|---|---|---|
| Example 36 | Tartaric acid | 5 | 84.2 | 84.7 | 71.3 |
| Example 37 | Tartaric acid | 10 | 91.5 | 83.3 | 76.2 |
| Example 38 | Tartaric acid | 20 | 87.6 | 84.3 | 73.8 |
| Example 39 | Citric acid | 10 | 87.0 | 82.5 | 71.8 |
| Example 40 | Succinic acid | 10 | 85.9 | 86.3 | 74.1 |
| Example 41 | Mannitol | 10 | 77.5 | 89.4 | 69.3 |
| Example 42 | Pyrogal- | 10 | 89.3 | 85.0 | 75.9 |

Table 4-continued

| Kind of organic material | Amount of organic material | Conversion of methacrolein (%) | Selectivity methacrylic acid (%) | Single flow yield of methacrylic acid (%) |
|---|---|---|---|---|
| lol | | | | |

EXAMPLES 43 TO 49

In accordance with the process of Example 35 except adding 5.7 g of cuprous bromide instead of 4.0 g of cuprous chloride, a catalyst having the formula of $$Mo_{12}P_{1.8}As_{0.4}V_{0.6}Cu_{0.4}Ce_{0.2} \text{ (except oxygen)}$$

and containing 10 wt. % of diatomaceous earth was prepared and used in the oxidation of methacrolein. The results are shown in Table 5.

In accordance with the process of Example 35 except adding cupric chloride, cupric hydroxide, cupric nitrate, cuprous iodide, cuprous fluoride or cuprous oxide instead of cuprous chloride, various catalysts were prepared.

The catalysts were used at the reaction temperature of 300° C. for the contact time of 2 seconds in the oxidation of methacrolein. The results are shown in Table 5.

The formula of the catalysts was the same with that of Example 35. Cupric chloride and cupric nitrate were added in a form of aqueous solution whereas the others were added in a form of powder.

Table 5

| | Kind of copper salt | Conversion of methacrolein (%) | Selectivity methacrylic acid (%) | Single flow yield of methacrylic acid (%) |
|---|---|---|---|---|
| Example 43 | CuBr | 89.7 | 82.0 | 73.6 |
| Example 44 | CuCl$_2$ | 76.5 | 84.1 | 64.3 |
| Example 45 | Cu(OH)$_2$ | 71.4 | 82.7 | 59.0 |
| Example 46 | Cu(NO$_3$)$_2$ | 72.0 | 84.5 | 60.8 |
| Example 47 | CuI | 86.1 | 85.2 | 73.4 |
| Example 48 | CuF | 85.7 | 83.8 | 71.8 |
| Example 49 | Cu$_2$O | 68.3 | 84.9 | 58.0 |

Reference 24

In accordance with the process of Reference 22 except adding 100 ml of aqueous solution containing 4.8 g of cupric nitrate instead of 4.0 g of cuprous chloride, a catalyst having the formula of $$Mo_{12}P_{1.8}As_{0.4}V_{0.6}Cu_{0.2} \text{ (except oxygen)}$$

and containing 10 wt. % of diatomaceous earth was prepared.

The catalyst was used at the reaction temperature of 300° C. for the contact time of 2 seconds in the oxidation of methacrolein.

As the results, the conversion of methacrolein was 47.3%; the selectivity of methacrylic acid was 86.5%; and the single flow yield of methacrylic acid was 40.9%.

EXAMPLE 50

In 240 ml of distilled water heated at about 80° C., 212 g of ammonium paramolybdate was dissolved and 120 ml of aqueous solution containing 23.8 g of ammonium phosphate and 7.0 g of ammonium arsenate was added.

In 200 ml of hot water, 7.0 g of ammonium metavanadate and 9.2 g of ammonium chromate were dissolved and 20 g of oxalic acid was added and heated under stirring and the resulting solution was added to the former solution. Then, 80 ml of aqueous solution containing 8.7 g of cerous nitrate was added and 4.0 g of cuprous chloride was added and the solution was stirred, and 24 g of diatomaceous earth was further added to the solution. The mixture was heated and concentrated under stirring on a hot water bath and was dried. The resulting solid product was pulverized and press-molded to obtain pellets having a diameter of 5 mm. The pellets were calcined at 300° C. for 2 hours in air and were sintered at 380° C. for 6 hours to obtain a catalyst having the formula of $$Mo_{12}P_{1.8}As_{0.4}V_{0.6}Cu_{0.4}Ce_{0.2}Cr_{0.6} \text{ (except oxygen)}$$

and containing 10 wt. % of diatomaceous earth.

The catalyst was used at the reaction temperature of 300° C. for the contact time of 2 seconds in the oxidation of methacrolein.

As the results, the conversion of methacrolein was 92.4%; the selectivity of methacrylic acid was 83.5% and the single flow yield of 77.2%.

EXAMPLE 51 and Reference 25

The life of the catalyst of Example 35 which had the formula of $$Mo_{12}P_{1.8}As_{0.4}V_{0.6}Cu_{0.4}Ce_{0.2}$$

and contained 10 wt. % of diatomaceous earth was tested under the condition of the reaction temperature of 300° C. and SV ≈ 1,800.

The life of the catalyst of Reference 22 which had the formula of $$Mo_{12}P_{1.8}As_{0.4}V_{0.6}Cu_{0.4}$$

and contained 10 wt. % of diatomaceous earth was also tested under the same condition.

The results are shown in Table 6. The catalyst of Example 35 having the cerium component imparted remarkably high catalytic activity and stable catalytic characteristics having smaller decrease of catalytic activity.

Table 6

| Catalyst | Condition of Reaction | | | Converson of methacrolein (%) | Selectivity of methacrylic acid(%) | Single flow yield of methacrylic acid (%) |
|---|---|---|---|---|---|---|
| | Reaction temp. | Bath temp. | Days for operation | | | |
| | 300° C. | 289° C. | 2 | 86.8 | 86.0 | 74.6 |

Table 6-continued

| | Catalyst | Condition of Reaction Reaction temp. | Bath temp. | Days for operation | Converson of meth- acrolein (%) | Selectivity of methacrylic acid(%) | Single flow yield of meth- acrylic acid (%) |
|---|---|---|---|---|---|---|---|
| | $Mo_{12}P_{1.8}As_{0.4}$ | " | 292°0 C. | 20 | 84.5 | 87.5 | 73.9 |
| Example 51 | $V_{0.6}Cu_{0.4}Ce_{0.2}$ diatomaceous | " | " | 40 | 85.6 | 85.9 | 73.5 |
| | earth | " | " | 60 | 83.7 | 84.9 | 71.1 |
| | 10 wt. % | " | " | 90 | 84.3 | 85.1 | 71.7 |
| | | " | " | 120 | 82.8 | 84.8 | 70.2 |
| | | 300° C. | 292° C. | 2 | 56.7 | 85.2 | 48.3 |
| Reference 25 | $Mo_{12}P_{1.8}As_{0.4}$ $V_{0.6}Cu_{0.4}$ | " | " | 20 | 54.3 | 85.7 | 46.5 |
| | | " | 294° C. | 40 | 51.0 | 84.1 | 42.9 |
| | diactomaceous earth | " | " | 60 | 49.3 | 85.0 | 41.9 |
| | 10 wt. % | " | " | 90 | 46.1 | 83.2 | 38.4 |
| | | " | " | 120 | 44.7 | 82.6 | 36.9 |

EXAMPLE 52

In accordance with the process of Example 50, a catalyst having the formula of $$Mo_{12}P_{1.8}As_{0.5}V_{0.6}Cu_{0.4}Ce_{0.2}Cr_{0.4} \text{ (except oxygen)}$$

and containing 10 wt. % of diatomaceous earth was prepared.

The catalyst was used at the reaction temperature of 300° C. for the contact time of 2 seconds in the oxidation of methacrolein.

As the results, the conversion of methacrolein was 90.2%; the selectivity of methacrylic acid was 86.7% and the single flow yield of methacrylic acid was 78.2%.

The life of the catalyst was tested under the condition of the reaction temperature of 300° C. and SV≈1,800. The results are shown in Table 7.

Table 7

| Catalyst | Conditon of Reaction Reaction temp. | Bath temp. | Days for operation | Conversion of meth- acrolein (%) | Selectivity of methacrylic acid (%) | Single flow yield of meth- acrylic acid (%) |
|---|---|---|---|---|---|---|
| | 300° C. | 288° C. | 2 | 90.3 | 86.2 | 77.8 |
| $Mo_{12}P_{1.8}As_{0.5}$ | " | " | 20 | 89.2 | 86.9 | 77.5 |
| $V_{0.6}Cu_{0.4}Ce_{0.2}Cr_{0.4}$ | " | 290° C. | 40 | 87.3 | 87.1 | 76.0 |
| diatomaceous earth | " | " | 60 | 88.5 | 85.4 | 75.6 |
| 10 wt. % | " | " | 90 | 89.3 | 85.5 | 76.4 |
| | " | " | 120 | 86.4 | 87.3 | 75.4 |

What is claimed is:

1. A process for producing methacrylic acid by the vapor phase catalytic oxidation of methacrolein with molecular oxygen or a molecular oxygen-containing gas, which comprises:
   conducting said oxidation reaction over a catalyst consisting of a multi-element complex oxide having the formula:

$$Mo_aP_bAs_cV_dCu_eCe_fCr_gO_h$$

wherein a=12, b=0.5 to 3.0, c=0.01 to 1.2, d=0.01 to 2.0, e=0.01 to 2.0, f=0.01 to 1.2, g=0 to 2.0 and h assumes a value which is dependent upon the valences of the other components of the catalyst within the range of 37 to 60.

2. The process of claim 1, wherein said catalyst is reduced with a dibasic carboxylic acid, an oxycarboxylic acid, mannitol or pyrogallol.

3. A process for producing methacrylic acid by the vapor phase catalytic oxidation of methacrolein with molecular oxygen or a molecular oxygen-containing gas, which comprises:
   conducting said oxidation reaction over a catalyst consisting of a multi-element complex oxide having the formula:

$$Mo_aP_bAs_cV_dCu_eCe_fCr_gO_h$$

wherein a=12, b=1.2 to 2.4, c=0.06 to 0.8, d=0.1 to 1.0, e=0.1 to 0.8, f=0.1 to 0.6, g=0 to 0.8 and h assumes a value which is dependent upon the valences of the other components of the catalyst within the range of 40 to 52.

4. The process of claim 3, wherein said catalyst is reduced with a dibasic carboxylic acid, an oxycarboxylic acid, mannitol or pyrogallol.

5. The process of claim 3, wherein said oxidation reaction is conducted at a temperature of 280° to 300° C.

6. A process according to claim 2 or 4 wherein the amount of the dibasic carboxylic acid, oxycarboxylic acid, mannitol and pyrogallol to the multi-element complex oxide is in a range of 5 to 40 wt. %.

7. The process of claim 6, wherein said dibasic carboxylic acid is oxalic acid or succinic acid and said oxycarboxylic acid is citric acid or tartaric acid.

8. The process of claim 6, wherein the amount of said reducing agent employed ranges from 10 to 20 wt. %.

* * * * *